United States Patent
Barrow

[19]

[11] Patent Number: 6,116,378
[45] Date of Patent: Sep. 12, 2000

[54] UNIVERSAL, COMPACT, TRUCK TAILGATE LADDER WITH SUPPORT ARMS

[76] Inventor: Sherman Dean Barrow, Rte. #1, Box 219 Old Pioneer, Eagle Pass, Tex. 78852

[21] Appl. No.: 09/208,207

[22] Filed: Dec. 9, 1998

[51] Int. Cl.[7] .................................................. B60R 19/00
[52] U.S. Cl. .......................... 182/127; 182/95; 182/97; 296/62; 280/166
[58] Field of Search ......................... 182/127; 280/166; 296/162; 187/97, 95, 86, 85

[56] References Cited

U.S. PATENT DOCUMENTS

| | | | |
|---|---|---|---|
| D. 296,887 | 7/1988 | Walling et al. | D12/203 |
| 3,853,369 | 12/1974 | Holden | 296/62 |
| 3,858,905 | 1/1975 | Peebles | 182/93 |
| 4,191,388 | 3/1980 | Barksdale | 280/166 |
| 4,264,084 | 4/1981 | Teles | 296/162 |
| 4,405,141 | 9/1983 | Jurek | 280/163 |
| 4,620,609 | 11/1986 | Elsten | 182/92 |
| 4,757,876 | 7/1988 | Peacock | 182/95 |
| 4,848,821 | 7/1989 | Llewellyn | 296/62 |
| 5,024,292 | 6/1991 | Gilbreath et al. | 182/90 |
| 5,028,063 | 7/1991 | Andrews | 280/166 |
| 5,205,603 | 4/1993 | Burdette, Jr. | 296/62 |
| 5,617,930 | 4/1997 | Elia | 182/97 |

FOREIGN PATENT DOCUMENTS

| | | | |
|---|---|---|---|
| 1270762 | 5/1964 | Germany | 182/106 |
| 2244753 | 12/1991 | United Kingdom | 182/106 |

*Primary Examiner*—Alvin Chin-Shue
*Attorney, Agent, or Firm*—John D. Gugliotta

[57] ABSTRACT

A universal, compact, truck tailgate ladder with support arms is disclosed, comprised of a folding ladder of otherwise conventional design, with upper leg members and lower leg members, and a series of parallel steps connecting each set of upper leg members and lower leg members. The present invention is designed to attach to the interior surface of a pick-up truck tailgate via a fastening means, such as bolts.

10 Claims, 6 Drawing Sheets

UNIVERSAL, COMPACT, TRUCK TAILGATE LADDER WITH SUPPORT ARMS

RELATED APPLICATIONS AND DISCLOSURES

The present invention was first described in Disclosure Document filed on Apr. 2, 1998. There were no previously filed, nor any copending applications anywhere in the world.

BACKGROUND OF THE INVENTION

1. Field of the Invention

The present invention relates generally to ladders and, more particularly, to a universal, compact, truck tailgate ladder with support arms.

2. Description of the Related Art

The pick up truck has become one of the most popular vehicles on the road today. No longer used primarily as a company or work vehicle, the pick-up truck is being purchased as a family vehicle due to their convenience and the availability of options that make their ride as comfortable and luxurious as many of their automobile counterparts.

This is not to say that the use of a pick-up truck does not come without any drawbacks. For example, one of the most typical drawbacks is that many people experience trouble accessing the bed portion of the pick-up truck. They are either not tall enough to reach over the sides of the bed or they have trouble climbing up into the truck bed due to the height at which it is located, which can be considerable depending on the type of vehicle. Accordingly, there is a need for a means by which one can access the bed of a pick-up truck easily with a minimal amount of stress or effort.

Another problem associated with entering the bed portion of a pick-up truck is the risk of injury associated with entering the bed portion. Maintaining balance while climbing into the bed portion may be difficult, especially for the elderly, weak and the young.

In the related art, several patents disclose a foldable ladder assembly for a tailgate of a truck. U.S. Pat. No. 5,205,603 issued in the name of Burdette, discloses a ladder mounted slidably and telescopingly inside a tailgate portion.

The problem with the '603 device is that the handle is not integral to the invention, and thus must be separately stored. This increases the risk of loss of the handle. Also, the handle is not adjustable, and cannot be adjusted to facilitate use by operators of varying heights.

U.S. Pat. No. 5,617,930 issued in the name of Elia discloses a rotatable ladder assembly utilizing a wing nut and washer combination which engages the bolt to retain the bar and the components in position when the ladder assembly is in storage position.

U.S. Pat. No. 5,028,063 issued in the name of Andrews discloses a foldable step assembly with handrails, with a base assembly attached to the tailgate inner face with staysert fasteners. The problem with the '063 device is that the handrails are not adjustable.

U.S. Pat. No. 5,024,292 issued in the name of Gilbreath, discloses a portable ladder assembly adapted to be removably mounted between the body of a conventional truck trailer and the tie down rail. The ladder assembly is attached to the rear of the trailer body via jack bolts.

U.S. Pat. No. 4,848,821 issued in the name of Llewellyn, discloses a foldable ladder assembly attached to the outside of a tailgate. A cable is attached to the tailgate and top rear end of pickup to assist the user in climbing. The ladder assembly is mounted to the tailgate via carriage bolts. Pins inserted through holes provide pivotal movement of lower leg members.

The problem with the '821 device is that it is connected to the exterior of the tailgate. This reduces the aesthetics of the truck. Also, any damage to the truck tailgate during use would be visible, since the connection point is on the exterior of the vehicle. In addition, connection of bike racks, or other devices, to the rear tailgate is hindered.

Another problem with the '821 device is that since it does not come into contact with the ground, it is subject to horizontal and vertical movement as the truck moves during use of the invention. This increases the risk of injury to the operator, as stability is reduced during use.

U.S. Pat. No. 4,757,876 issued in the name of Peacock, discloses a collapsible step ladder assembly attached to the inside of a tailgate utilizing parallel yokes as hinging means.

The problem with the '876 device is that the legs are not self adjusting, and require bending down to adjust each leg separately. This is extremely difficult for the weak, infirm, and elderly. Also, the hinges connect the invention directly to the tailgate. This small connection area increases the risk of structural integrity failure of the hinges, especially during lateral movements of the ladder. As such, the risk of damage to the tailgate and consequent injury to the operator is increased.

U.S. Pat. No. 4,620,609 issued in the name of Elsten discloses a removable bumper step which engages the upper edge of a vehicle bumper.

U.S. Pat. No. 4,405,141 issued in the name of Juick, discloses a pair of separate stackable steps which are removably attached to the bumper of a vehicle.

U.S. Pat. No. 4,191,388 issued in the name of Barksdale, discloses a foldable ladder assembly mounted to the inside of a tailgate by utilizing L-shaped rods which are secured on one end by a nut. This invention consists of one step. The assembly is made pivotable by virtue of a bolt.

The problem with the '388 device is that since it does not come into contact with the ground, it is subject to horizontal and vertical movement as the truck moves during use of the invention. This increases the risk of injury to the operator, as stability is reduced during use.

U.S. Pat. No. D 296, 887 issued in the name of Walling et al., discloses an ornamental design for a triangularly-shaped vehicle tailgate step.

U.S. Pat. No. 3,853,369 issued in the name of Holden, discloses a foldable step assembly connected to the rear tailgate, and collapsible to a storage position. The assembly consists of spaced arms with pivoting arms and intermediate portions suspended by a linkage to the edge of the tailgate.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved universal, compact, truck tailgate ladder with support arms that is foldable, has telescoping lower leg members, is easy to use, and is securely attached to the interior surface of a truck tailgate.

Briefly described according to one embodiment of the present invention, a universal, compact, truck tailgate ladder with support arms is disclosed, comprising a folding ladder of otherwise conventional design, with upper leg members and lower leg members, and a series of parallel steps connecting each set of upper leg members and lower leg members.

A folding means connects the upper leg members to a tailgate plate.

The tailgate plate is of a linearly elongated, rectangular configuration, and is designed to be secured to the interior surface of a tailgate. As such, the present invention is designed to attach to the interior surface of a pick-up truck tailgate via a fastening means, such as bolts.

The upper leg members and lower leg members, once in the folded position, are releasably secured to the truck tailgate via a tailgate securement means.

The present invention is universal in design, being capable of use with a variety of truck tailgates of differing heights. The lower leg members of the present invention are vertically telescoping, facilitating adjustment of the vertical length of the present invention.

The present invention folds along the midpoint of the elongated centerline of the present invention. Folding is facilitated by a folding means, such as hinges.

A spring loaded protrusion assembly is located on at least one upper leg member.

It is envisioned that a support arm assembly is connected to the exterior surface of at least one upper leg member at a point above the folding means, as is of sufficient length to facilitate use as a hand rest during use of the present invention.

The support arm is designed so that in the retracted position, the support arm rests flat against the exterior surface of an upper leg member, and does not interfere with the folding of the present invention.

It is envisioned that the present invention is constructed of a material selected from the group comprising metal or plastic.

The present invention is designed such that when the tailgate is closed, the ladder lies against the inside surface of the tailgate in its folded position. When the tailgate is opened, the ladder folds out, extending outward and downward to the ground, providing an angled step-like ladder that one can easily climb in order to gain access to the truck bed.

It is envisioned that the present invention comes in a kit form. The kit comes with all of the necessary nuts, bolts and other fastening means, and can be installed in a relatively short period of time. The overall length of the ladder is such that it will adapt to the height between the tailgate and the ground automatically, without requiring any adjustments.

It is another object of the present invention to provide a device that facilitates easy access to a truck bed.

It is another object of the present invention to provide a device that rests against the ground during use, thus reducing the risk of movement of the device during use, and subsequent injury to the operator.

It is another object of the present invention to provide a device that is connected to the tailgate at multiple points, thus reducing structural integrity failure of the present invention during use.

It is another object of the present invention to provide a device that is not seen by onlookers when the truck is in motion, thus preserving the aesthetic integrity of the truck when the present invention is not in use.

It is another object of the present invention to provide a compact, folding design.

It is another object of the present invention to provide a device that is universal in application, adaptable to varying tailgate heights.

It is another object of the present invention to provide a device that is easy to install.

It is another object of the present invention to provide a device that is safe and easy to use, featuring support arms that permit the operator to balance himself or herself with his or her hands.

DESCRIPTIVE KEY

| | | | |
|---|---|---|---|
| 10 | a universal, compact, truck tailgate ladder with support arms | 150 | spring loaded pin handle |
| | | 160 | spring loaded protrusion assembly |
| 20 | upper leg members | 170 | hole |
| 30 | lower leg members | 180 | adjustment protrusion |
| 40 | parallel steps | 190 | protrusion handle |
| 50 | folding means | 200 | coiled spring |
| 60 | tailgate plate | 210 | limiting plates |
| 70 | tailgate | 220 | support arm assembly |
| 80 | fastening means | 230 | support arm plate |
| 90 | tailgate plate holes | 240 | pivoting means |
| 100 | tailgate securement means | 250 | adjustment holes |
| 110 | scratch preventive material | 260 | support arm body |
| 120 | sliding member | 270 | telescoping means |
| 130 | pivoting detents | 280 | handle portion |
| 140 | spring loaded pin | | |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a universal, compact, truck tailgate ladder with support arms 10.

The best mode for carrying out the invention is presented in terms of its preferred embodiment, herein depicted within the FIGS. 1 through 7.

1. Detailed Description of the Figures

Figure 1:
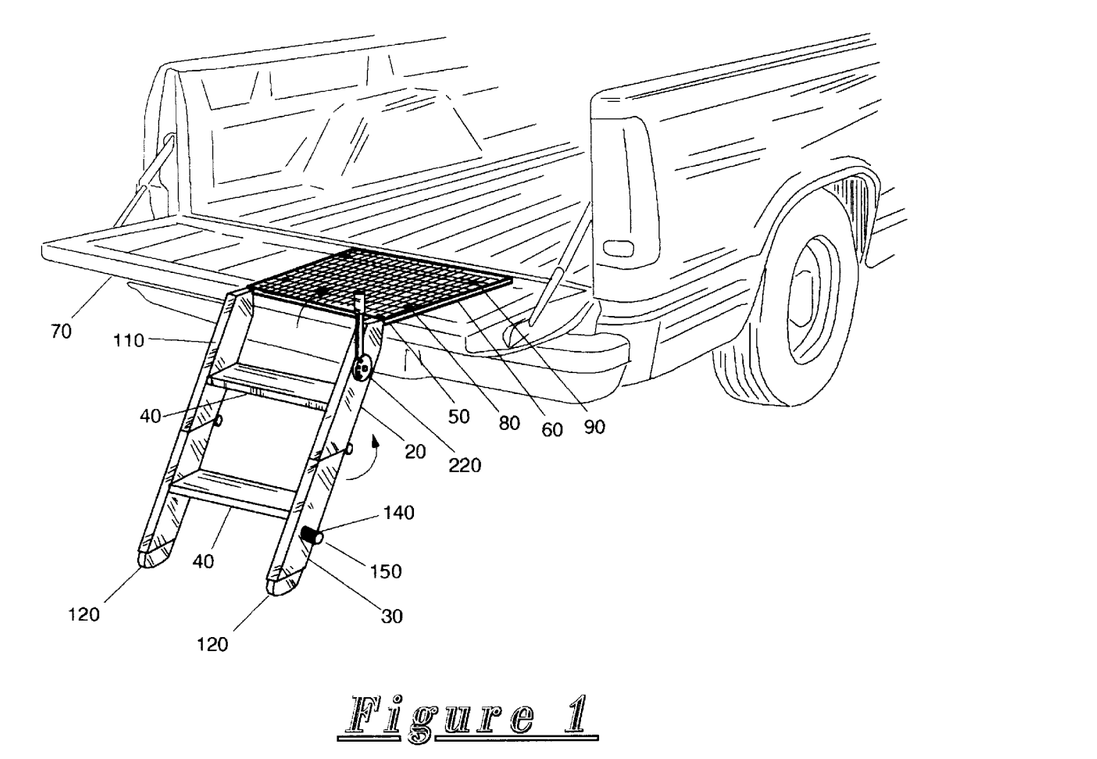
FIG. 1 is a front perspective view of the preferred embodiment of a universal, compact, truck tailgate ladder with support arms 10 with the present invention in the extended position.

Referring now to FIG. 1, a universal, compact, truck tailgate ladder with support arms 10 is shown, according to the present invention, comprises a folding ladder of otherwise conventional design, with upper leg members 20 and lower leg members 30, and a series of parallel steps 40 connecting each set of upper leg members 20 and lower leg members 30.

Figure 2:
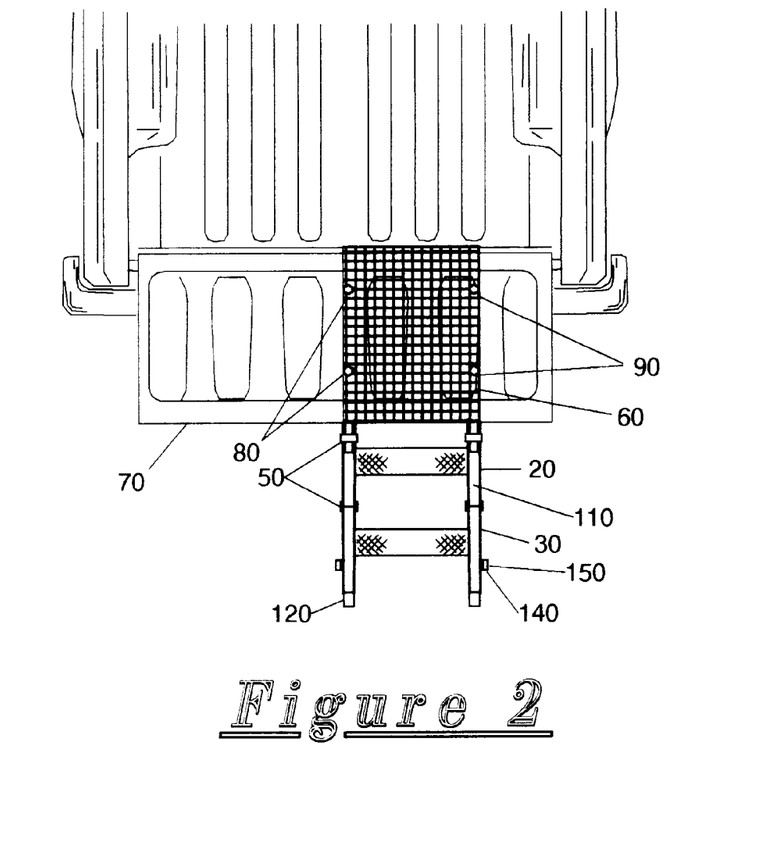
FIG. 2 is a front view thereof.

Referring now to FIGS. 1 & 2, a folding means 50, such as hinges, are located on the top of the upper leg members 20. The folding means 50 connect the upper leg members 20 to a tailgate plate 60.

The tailgate plate 60 is of a linearly elongated, rectangular configuration, and is designed to be secured to the interior surface of a tailgate 70. As such, the present invention is designed to attach to the interior surface of a pick-up truck tailgate 70 via a fastening means 80, such as bolts. The fastening means 80 are placed through tailgate plate holes 90 which are located on the tailgate plate 60.

The upper leg members 20 and lower leg members 30, once in the folded position, are releasably secured to the truck tailgate 70 via a tailgate securement means (not shown), such as Velcro(hook and look), straps, U-bolts or the like.

The top of the upper leg members 20 is angled such that when the present invention is in the unfolded position, the top of the upper leg members 20 rest against the top of the tailgate 70 when the tailgate 70 is in the open position, thus providing structural support for the present invention and reducing the force placed on the folding means 50.

A scratch preventive material 110 is placed on the top of the upper leg members 20 to reduce the likelihood of scratching of the top of the tailgate 70 while the present invention is in use.

Figure 3:
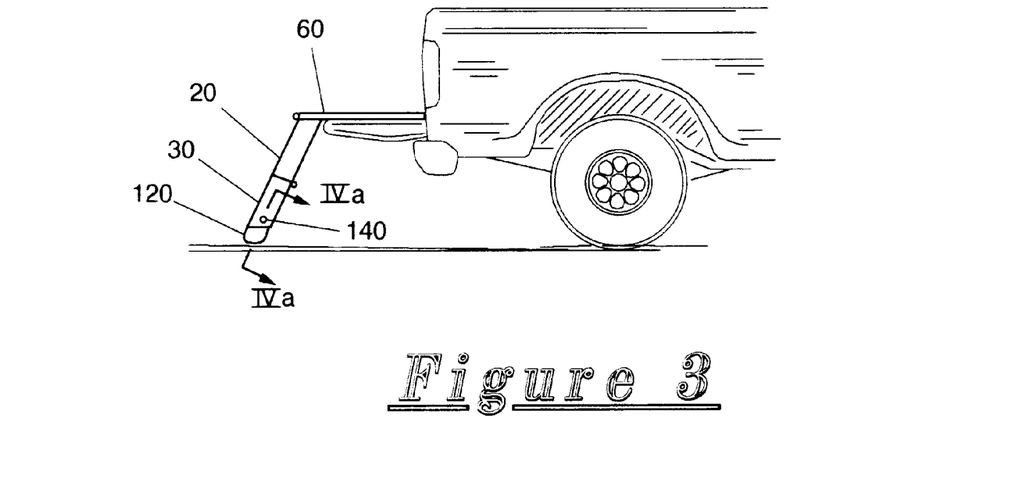
FIG. 3 is a left side view thereof; the right side view being a mirror image thereof.

Referring now to FIGS. 1, 2 & 3, the present invention is universal in design, being capable of use with a variety of truck beds of differing heights.

Figure 4:
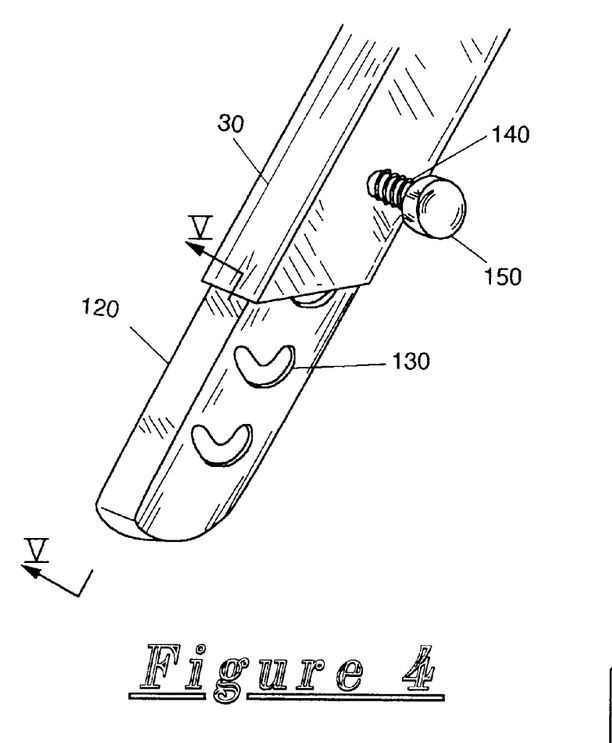
FIG. 4 is a cross sectional view of the lower leg member and sliding member cut along line IV—IV.
Figure 5:
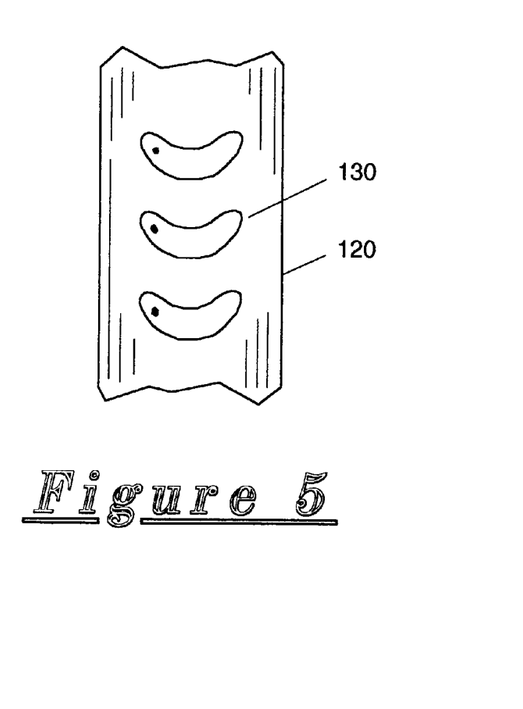
FIG. 5 is a cross sectional view of a sliding member, cut along line V—V.

Referring now to FIGS. 4 & 5, the lower leg members 30 of the present invention are vertically telescoping, via a sliding member 120, of generally a rectangular configuration, which slidably engages and inserts into each of the lower leg members 30.

A series of vertically aligned pivoting detents 130 are located on the exterior surface of the sliding member 120. A spring loaded pin 140, of linearly elongated configuration, is located on the lower leg member 30, positioned laterally, and capable of lateral movement via a spring loaded pin handle 150. "Pivoting detendes 130 is arc shaped and pivoted at one end via pivoting means such that a force placed on the lower side of the other end of pivoting detendes 130 will cause pivoting detendes 130 to pivot upwardly. A built in limiting means will prevent the pivoting detendes from pivoting downwardly."

The pivoting detents 130 and spring loaded pin 140 are configured and positioned such that, when the spring loaded pin 140 is in the resting position, the pivoting detents 130 will pivot upwardly allowing spring loaded pin 140 to pass by as the sliding member 120 is extended away from the lower leg member 30, but retraction of the sliding member 120 into the lower leg member 30 is limited by mechanical interference between the spring loaded pin 140 and pivoting detendes 130. Retraction of the spring loaded pin 140 removes the mechanical interference, thus permitting the sliding member 120 to be retracted into the lower leg member 30. As such, the sliding member 120 is self adjusting, and can be used automatically to adjust for variations in tailgate 70 height and ground conditions.

Figure 6A:
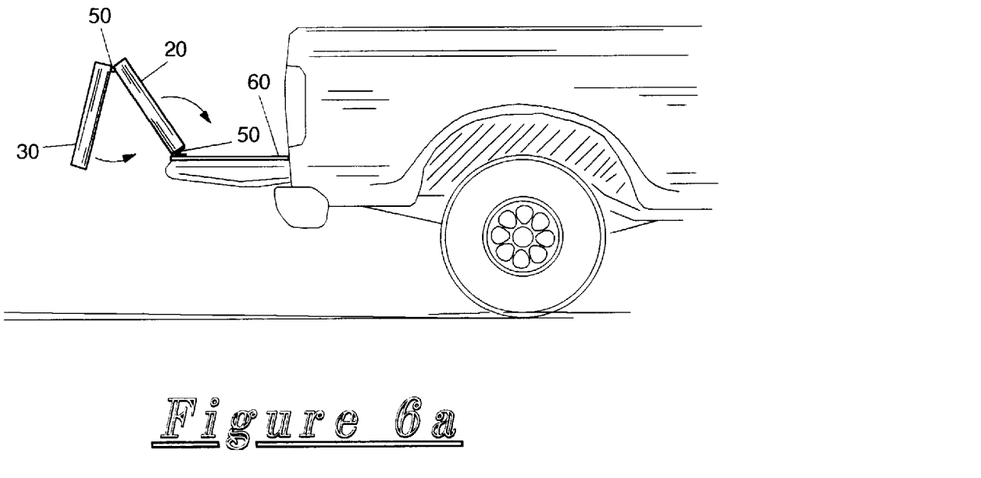
FIG. 6a is a left side view of the present invention in the partially folded position.

Referring now to FIG. 6a, the present invention folds along the midpoint of the elongated centerline of the present invention. Folding is facilitated by a folding means 50, such as hinges. The folding means 50 is positioned along the upper most surface of the present invention when attached to a truck bed, such that the lower portion of the present invention folds under the top portion of the present invention.

Figure 6B:
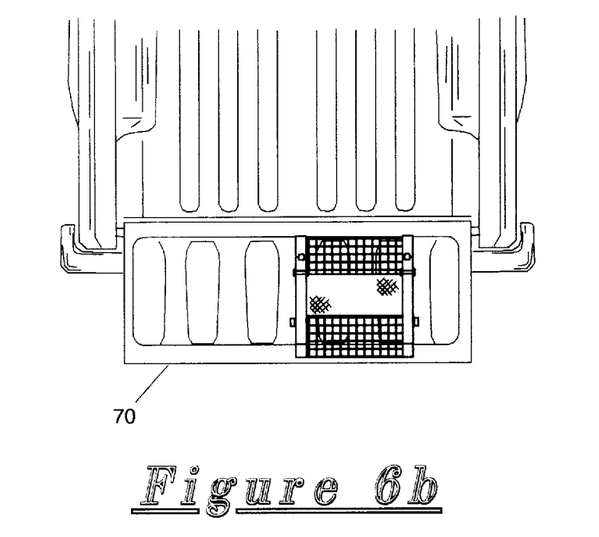
FIG. 6b is a top view thereof in the folded position.

Referring now to FIGS. 6a & 6b, the present invention is designed to be folded by raising the present invention and folding the lower leg members 30 under the upper leg members 20. The present invention is then folded onto the tailgate plate 60 located on the interior surface of the truck tailgate 70.

Figure 7A:
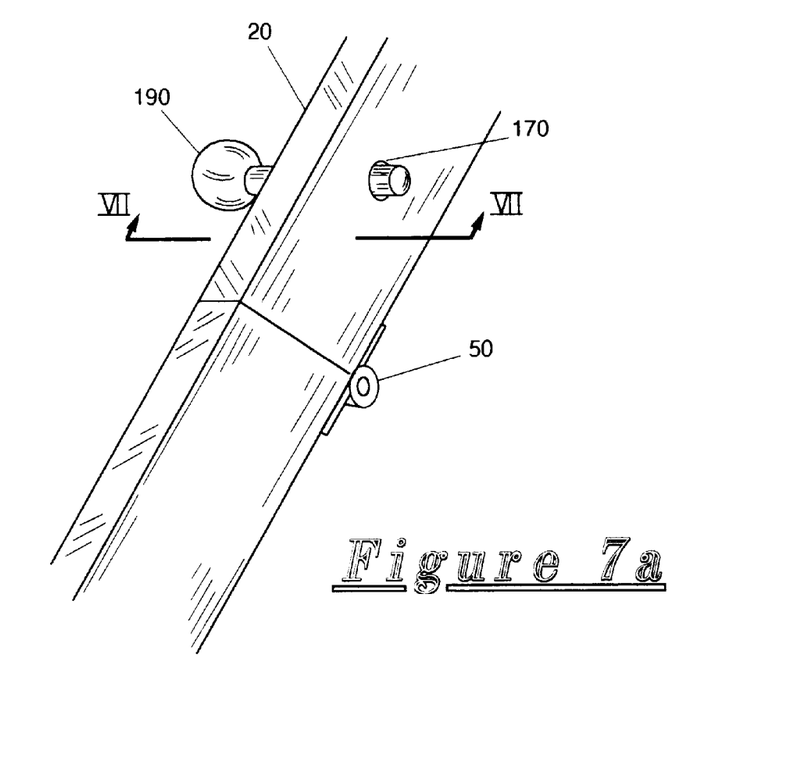
FIG. 7a is an exploded view of the spring loaded protrusion assembly.

Referring now to FIG. 7a, a spring loaded protrusion assembly 160 is located on at least one upper leg member 20. A hole 170 is located on both the exterior and interior surfaces of the upper leg member 20, passing laterally through the upper leg member 20. An adjustment protrusion 180, of a linearly elongated configuration, slidably engages both holes 170, passing laterally through the upper leg member 20, extending laterally, slightly outward on both sides.

Figure 7B:
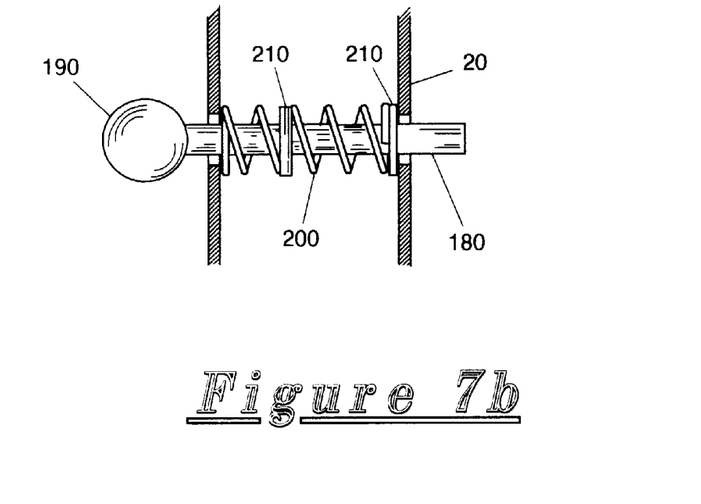
FIG. 7b is a cross sectional view thereof, cut along line VII—VII.

Referring now to FIGS. 7a & 7b, a protrusion handle 190, located on the end of the adjustment protrusion 180, on the interior side of the upper leg member 20, provides adjustment via lateral movement of the adjustment protrusion 180. A coiled spring 200 is positioned on the adjustment protrusionl 180, inside the upper leg member 20. Lateral movement of the adjustment protrusion 180 is limited by two limiting plates 210. The limiting plates 210 are connected to the adjustment protrusion 180, inside the upper leg member 20, and come into mechanical interference with the interior walls of the upper leg member 20, thus limiting lateral movement of the adjustment protrusion 180.

Figure 8:
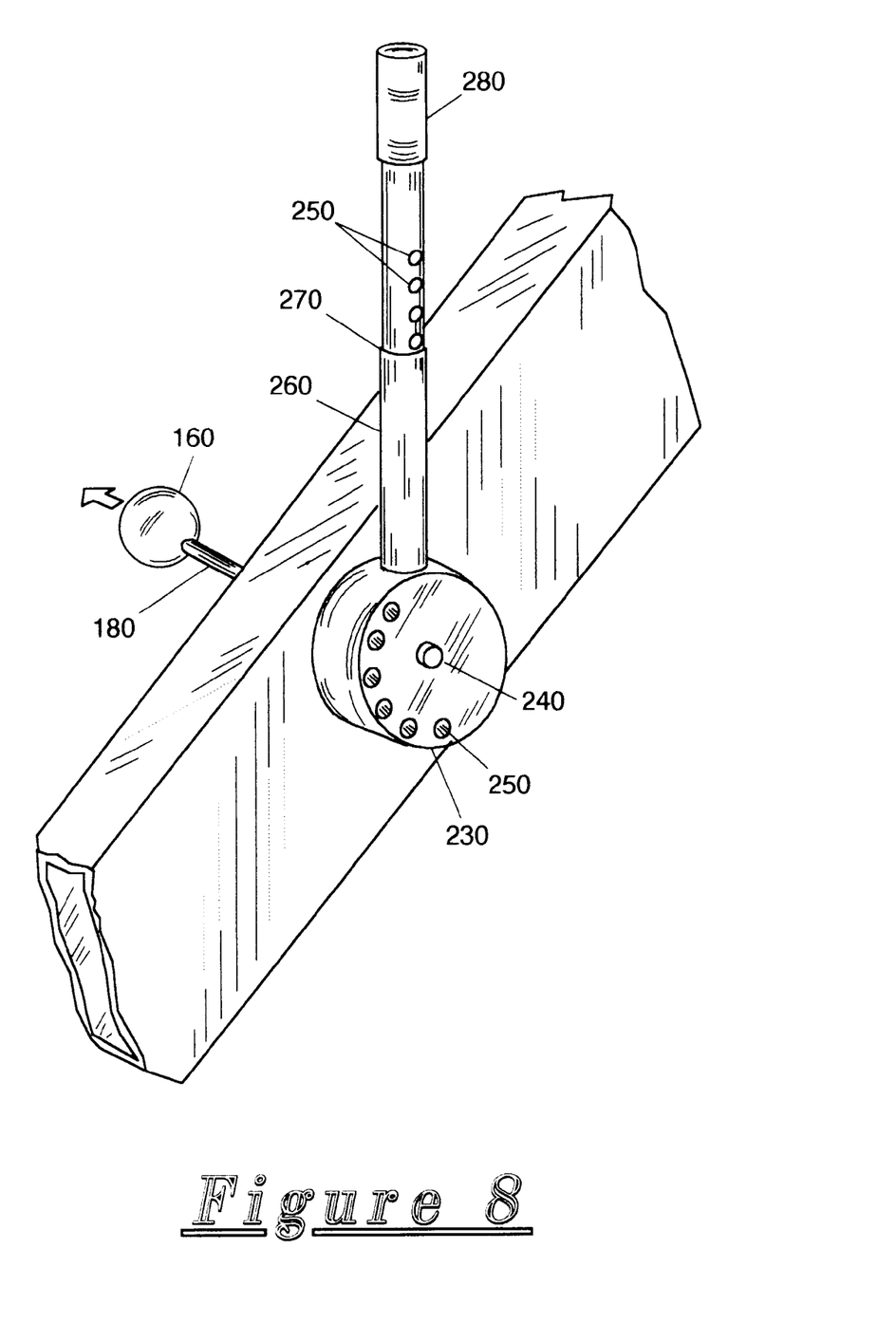
FIG. 8 is a perspective view of the support arm assembly.

Referring now to FIG. 8, it is envisioned that a support arm assembly 220 is connected to the exterior surface of at least one upper leg member 20 at a point above the folding means 50. The support arm assembly 220 is of sufficient length to facilitate use as a hand rest during use of the present invention.

The support arm assembly 220 consists of support arm plate 230, of a generally circular configuration. The support arm plate 230 is pivotally secured to the exterior surface of at least one upper leg member 20 via a pivoting means 240, such as a bolt, which permits rotation of the support arm plate 230 in an arc of 180 degrees.

A series of adjustment holes 250 are located along the edge of the flat face of the support arm plate 230, and run through the support arm plate 230. The adjustment holes 250 are used with the spring loaded protrusion assembly 160 to selectively adjust the desired direction in which the support arm plate 230 is positioned relative to the lateral exterior surface of the upper leg member 20. The adjustment protrusion 180 is designed to slidably engage the adjustment holes 250.

Attached to the exterior circumferential surface of the support arm plate 230 is a linearly elongated support arm body 260. The support arm body 260 is of a telescoping configuration, thus facilitating use by operators of varying configurations. Telescoping is achieved via a telescoping means 270, such as a spring loaded ball bearing and leg adjustment holes 250.

Attached to the end of the support arm body 260, opposite the support arm plate 230, is a handle portion 280. The handle portion 280 is designed to be grabbed by the hand of the user to facilitate stability during use of the present invention.

The support arm assembly 220 is designed such that in the retracted position, the support arm body 260 rests flat against the exterior surface of an upper leg member 20, and does not interfere with the folding of the present invention.

It is envisioned that the present invention is constructed of a material selected from the group comprising metal or plastic.

Referring now to FIGS. 1, 6a & 6b, the present invention is designed such that when the tailgate 70 is closed, the present invention lies against the interior surface of the tailgate 70 in its folded position. When the tailgate 70 is opened, the present invention may be folded out, extending outward and downward to the ground, providing an angled step-like ladder that one can easily climb in order to gain access to the truck bed.

It is envisioned that the present invention comes in a kit form. The kit comes with all of the necessary nuts, bolts and other fastening means 80, and can be installed in a relatively short period of time. The overall length of the present invention is such that it will adapt to the height between the tailgate 70 and the ground automatically.

It is envisioned that other styles and configurations of the folding means 50, tailgate plate 60, upper leg members 20 and lower leg members 30, spring loaded protrusion assemblies 160, tailgate securement means 100 and support arm assemblies 220 can be easily incorporated into the teachings of the present invention, and only one particular configuration shall be shown and described for purposes of clarity and disclosure and not by way of limitation of scope.

2. Operation of the Preferred Embodiment

To use the present invention, the operator: first, opens the tailgate 70 and releases the tailgate securement means 100; second, unfolds the present invention; third, adjusts the length of the lower leg members 30; fourth; pulls laterally on the protrusion handle 190; fifth, pivots the support arm assembly 220 in the proper position; sixth, locks the support arm body 260 in place by releasing the protrusion handle 190; seventh, uses the present invention; eighth, when done using the present invention, fold down the support arm body 260, folds the lower leg members 30 under the upper leg members 20, retract the sliding member 120 into the lower leg member 30 by pulling the spring loaded pin 140 on the lower leg member 30, folds the present invention onto the interior surface of the tail gate 70, secures the tailgate securement means, and closes the tail gate 70.

The foregoing description is included to illustrate the operation of the preferred embodiment and is not meant to limit the scope of the invention. The scope of the invention is to be limited only by the following claims.

What is claimed is:

1. A universal, compact, truck tailgate ladder with support arms, said tailgate ladder comprising:
    a folding ladder with upper leg members and lower leg members, and a series of parallel steps connecting said upper leg members and said lower leg members;
    a tailgate plate, of a linearly elongated, rectangular configuration, said tailgate plate designed to be secured to a interior surface of a tailgate, said tailgate plate having tailgate plate holes;
    a first folding means located on the top of said upper leg members and a second folding means between said upper leg members and said lower leg members, said first folding means designed to connect said upper leg members to said tailgate plate;
    fastening means, said fastening means placed through said tailgate holes to attach said truck tailgate ladder to the interior surface of a pick up truck tailgate;
    tailgate securement means, said tailgate securement means used to releasably secure said upper leg members and lower leg members, once in the folded position, to said truck tailgate;
    at least one support arm assembly, said at least one support arm assembly connected to the exterior surface of at least one upper leg member at a point above said second folding means, and used as a rail for a hand to balance an operator during use of the tailgate ladder; and
    at least one spring loaded protrusion assembly, located on the at least one upper leg member, said spring loaded protrusion assembly designed to facilitate adjustment of said support arm assembly relative to said at least one upper leg member;
    wherein, said support arm assembly further comprising:
        a support arm plate, of a generally circular configuration, said support arm plate pivotally secured to the exterior surface of the at least one upper leg member;
        a pivoting means, said pivoting means used to connect said support arm plate to said at least one upper leg member, while permitting rotation of said support arm plate in an arc of 180 degrees;
        a series of adjustment holes, located along the edge of the flat face of said support arm plate, and running through said support arm plate, said adjustment holes designed for use with said spring loaded protrusion assembly to selectively adjust the desired direction in which said support arm plate is positioned relative to the exterior surface of said upper leg member, said spring loaded protrusion assembly is designed to slidably engage said adjustment holes; a support arm body, of a generally linear elongated, telescoping configuration, said support arm body attached to the exterior circumferential surface of said support arm plate body, said telescoping achieved via a telescoping means; and
        a handle portion, said handle portion being attached to an end of said support arm body, opposite said support arm plate, said handle portion designed to be grabbed by the hand of the user to facilitate stability during use of the tailgate ladder.

2. The support arm assembly described in claim 1, wherein said support arm assembly is designed such that in the retracted position, said support arm body rests flat against the exterior surface of the at least one upper leg member, and does not interfere with the folding of the present invention.

3. The tailgate ladder described in claim 1, wherein the present invention is constructed of a material selected from the group consisting of metal or plastic.

4. The tailgate ladder described in claim 1, wherein said tailgate ladder comes in a kit form, said kit further comprising nuts, bolts and further fastening means.

5. The tailgate ladder described in claim 1, wherein said tailgate ladder automatically adjusts its height to adjust for variations in truck tailgate height and ground conditions, and as such, said tailgate ladder is universal in design, being capable of use with a variety of truck beds of differing heights.

6. The tailgate ladder described in claim 1, wherein the top of said upper leg members is angled to rest against the top of said tailgate when said tailgate is in the open position, thus providing structural support for said tailgate ladder and reducing the force placed on said folding means.

7. The tailgate ladder described in claim 1, wherein said lower leg members are vertically telescoping, via a sliding member, of generally a rectangular configuration, which slidably engages and inserts into each of said lower leg members.

8. The tailgate ladder described in claim 7, wherein said tailgate ladder further comprises:
   - a series of vertically aligned pivoting detendes, said pivoting detendes located on the exterior surface of said sliding member;
   - a spring loaded pin, of linearly elongated configuration, said spring loaded pin located on said lower leg member, positioned laterally, and capable of lateral movement via a spring loaded pin handle, said pivoting detendes and spring loaded pin are configured and positioned such that, when said spring loaded pin is in the resting position, said pivoting detents will pivot upwardly allowing spring loaded pin to pass by as said sliding member is extended away from said lower leg member, but retraction of said sliding member into said lower leg member is limited by mechanical interference between said spring loaded pin and pivoting detendes.

9. The tailgate ladder described in claim 8, wherein retraction of said spring loaded pin removes the mechanical interference, thus permitting said sliding member to be retracted into said lower leg member, and as such, said sliding member is self adjusting, and can be used automatically to adjust for variations in tailgate height and ground conditions.

10. The tailgate ladder described in claim 1, wherein said spring loaded protrusion assembly further comprising:
   - a set of holes, said holes located on both the exterior and interior surfaces of said at least one upper leg member, passing laterally through said upper leg member;
   - an adjustment protrusion, of a linearly elongated configuration, said adjustment protrusion slidably engaging both holes, passing laterally through said at least one upper leg member, and extending laterally, slightly outward on both sides;
   - a protrusion handle, located on an end of said adjustment protrusion, on the interior side of said at least one upper leg member, said protrusion handle designed to provide adjustment of said adjustment protrusion via lateral movement of said adjustment protrusion;
   - a coiled spring, said coiled spring positioned on said adjustment protrusion, inside said at least one upper leg member; and
   - two limiting plates, said limiting plates connected to said adjustment protrusion, inside said upper leg member, and designed to come into mechanical interference with interior walls of said at least one upper leg member, thus limiting lateral movement of said adjustment protrusion.

* * * * *